United States Patent [19]

Sahara et al.

[11] 4,325,617
[45] Apr. 20, 1982

[54] CAMERA EXPOSURE CONTROL DEVICE

[75] Inventors: Masayoshi Sahara, Sennan; Nobuyuki Taniguchi, Sakai, both of Japan

[73] Assignee: Minolta Camera Kabushiki Kaisha, Osaka, Japan

[21] Appl. No.: 139,683

[22] Filed: Apr. 14, 1980

[30] Foreign Application Priority Data

Apr. 18, 1979 [JP] Japan .................................. 54/48298

[51] Int. Cl.³ .............................................. G03B 7/087
[52] U.S. Cl. ......................................... 354/31; 354/38
[58] Field of Search ....................... 354/29, 30, 31, 36, 354/38, 43, 44, 50, 51, 60 R

[56] References Cited

U.S. PATENT DOCUMENTS 3,829,867  8/1974  Ono ........................................ 354/29
4,103,307  7/1978  Shinoda et al. ................... 354/50 X
4,174,160  11/1979  Nanba et al. ..................... 354/38 X Primary Examiner—L. T. Hix
Assistant Examiner—William B. Perkey
Attorney, Agent, or Firm—Watson, Cole, Grindle & Watson

[57] ABSTRACT

AE-lock photography with accurate exposure control is made possible by a camera exposure control device which memorizes outputs of a T.T.L. light measuring device at a desired time prior to a camera release operation and at a time immediately before the commencement of stopping-down operation of a diaphragm, respectively. The exposure control device arrests the diaphragm for determination of the diaphragm aperture when the light measuring device, during stopping-down of the diaphragm, represents a given relationship with the sum of, on one hand, the difference between the stored outputs and on the other hand a signal commensurate with a preselected shutter speed, and thereafter determines a shutter speed in accordance with the sum of, on one hand, the difference between the stored outputs and, on the other hand, the output of the light measuring device commensurate with the intensity of scene light measured through the determined diaphragm aperture. Information of a set film sensitivity is counted in the outputs of the light measuring device. A light measuring device which is different in type from the T.T.L. light measuring device may be employed for generation of an output which is stored in place of the output of the T.T.L. light measuring device generated at a desired time prior to a camera release operation.

13 Claims, 6 Drawing Figures

CAMERA EXPOSURE CONTROL DEVICE

BACKGROUND OF THE INVENTION

The present invention relates to a camera exposure control device which automatically controls an objective diaphragm aperture in accordance with a preselected shutter speed and the measurement of the scene light having passed through the diaphragm aperture which is being stopped-down. More particularly, it pertains to a camera exposure control device of the above type which is capable of AE-lock photography.

AE-lock photography herein referred to is photography in which exposure is controlled in accordance with stored light measurement effected for a desired portion of a scene to be actually photographed at any desired time prior to, and independently from, an actual camera release operation.

There has been proposed in U.S. Pat. No. 4,103,307 a camera exposure control device of the above type which enables AE-lock photography. Upon selection of a shutter speed priority exposure control mode, the camera exposure control device disclosed in the U.S. patent calculates and stores the step-difference between a fully open diaphragm aperture value and a diaphragm aperture value optimum for the light condition measured for the AE-lock photography. Next, upon actual photographing, the exposure control device measures the brightness of a scene to be actually photographed, through the fully open diaphragm aperture and stores a signal obtained by subtracting the above step-difference from the result of the last mentioned measurement. Subsequentially, the exposure control device measures the brightness of the scene to be actually photographed through the diaphragm which is being stopped-down, and causes diaphragm arresting means to arrest the diaphragm for determination of the diaphragm aperture when, in the course of the stopping-down operation of the diaphragm, the result of this last measurement represents a given relationship with respect to the stored signal obtained by the above subtraction. Thereafter, a shutter is controlled at the preselected shutter speed.

With the exposure control device, the stopping-down operation of the diaphragm is initiated in response to a camera release operation and the determination of the diaphragm aperture is completed for a comparatively short period of time, e.g., 50 m sec.. Hence, the diaphragm blades must be driven at a considerably high speed for the stopping-down operation of the diaphragm. On the other hand, the diaphragm arresting means inevitably has a certain response delay. As a result, at the very moment when the diaphragm arresting means is caused to be actuated, it fails to complete arrestment of the diaphragm, so that the diaphragm is erroneously stopped-down in excess of the optimum diaphragm aperture. It may be possible to preadjust the timing of the actuation of the diaphragm arresting means in anticipation of the amount of the excessive stopping-down of the diaphragm. In fact, however, this would fail to avoid the error in the determination of the diaphragm aperture because the amount of the excessive stopping-down of the diaphragm is affected by a variety of factors and cannot be constant.

SUMMARY OF THE INVENTION

It is, accordingly, an object of the present invention to provide a camera exposure control device which prevents occurrence of the above described exposure error upon AE-lock photography.

Another object of the present invention is to provide a camera exposure control device which corrects a preselected shutter speed by an amount commensurate with the difference between an actually determined diaphragm aperture and a diaphragm aperture to be automatically determined, whereby synthetically accurate exposure control is achieved for AE-lock photography by the combined control of the diaphragm aperture and the shutter speed.

To accomplish these objects, a camera exposure control device of the present invention comprises first light measuring means for measuring light having passed through an objective and a diaphragm and generating an output commensurate with the intensity of the measured light. Assume that the output generated at a desired time prior to a camera release operation is a first signal, that the output generated at a time immediately prior to commencement of stopping-down operation of the diaphragm is a second signal, and that the output generated during stopping-down operation of the diaphragm is a third signal.

The first and second signals are most probably different from one another because, with AE-lock photography, the subject of the light measurement at the time of generation of the first signal is rendered inconsistent with that at the time of generation of the second signal.

The third signal varies as the diaphragm is stopped-down. The camera exposure control device further comprises means for arresting the diaphragm and means for generating a fourth signal commensurate with a preselected shutter speed. Diaphragm control means calculates with the first to fourth signals during stopping-down operation of the diaphragm and generates an actuating signal for actuating the arresting means when the third signal represents a given relationship with respect to the sum of the fourth signal and the difference between the first and second signals. Shutter speed control means controls a shutter speed in accordance with the sum of the output of the first light measuring means generated after the diaphragm arrestment by the arresting means and the difference between the first and second signals. The shutter speed thus controlled by the shutter speed control means is the one which is corrected from the preselected shutter speed in accordance with the difference between the diaphragm aperture actually determined by the diaphragm arrestment by the arresting means and the diaphragm aperture to be automatically determined for the scene brightness measured for AE-lock photography and the preselected shutter speed.

Such correction of the preselected shutter speed enables synthetically accurate exposure control in combination with the actually determined diaphragm aperture for the subject of the AE-lock photography, for example, a part of an actually photographed scene.

The camera exposure control device of the present invention may further comprise auxiliary objective and diaphragm and second light measuring means for measuring light having passed through the auxiliary objective and diaphragm and generating an output commensurate with the intensity of the measured light. The second light measuring means as well as the first light measuring means is connectable to the diaphragm control means so that the output of the second light measuring means generated at a desired time prior to a camera release operation can be substituted for the first signal of the first light measuring means.

The above and other objects and features of the present invention will become more apparent from the following description taken along with the accompanying drawings.

DESCRIPTION OF PREFERRED EMBODIMENTS

Figure 1:
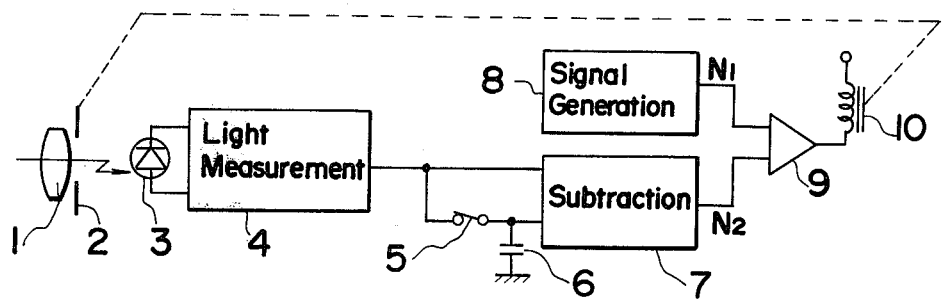
FIG. 1 is a block diagram schematically illustrating a general construction of a diaphragm setting circuit which is based on the present invention.

FIG. 1 shows a schematic construction of a diaphragm setting circuit on which the present invention is based. Shown in FIG. 1 are objective 1, objective diaphragm 2, light responsive element 3 for receiving a scene light having passed through diaphragm 2 and light measuring circuit 4 (these elements constituting a first light measuring means). Light measuring circuit 4 generates a voltage proportional to the logarithm of the intensity of incident light upon light responsive element 3. Switch 5 is opened immediately before the diaphragm starts to be stopped-down, thereby causing the output of light measuring circuit 4 at the fully opened condition of objective diaphragm 2 to be stored in capacitor 6. Subtraction circuit 7 subtracts an output voltage of light measuring circuit 4 from a charging voltage of capacitor 6. The output of light measuring circuit 4 when diaphragm 2 is being stopped-down is subtracted from the output of light measuring circuit 4 at the fully open aperture, whereby step difference N2 between the fully open aperture and the momentary stopped-down aperture is detected. Signal generator circuit 8 generates a voltage corresponding to predetermined step difference N1 of the aperture value. Output N1 of signal generator circuit 8 is compared with output N2 of subtraction circuit 7 by voltage comparator circuit 9. When outputs N1 and N2 coincide with each other, voltage comparator circuit 9 generates a signal which activates electromagnet 10 (diaphragm arresting means), which in turn arrests diaphragm 2 to stop its stopping-down operation. In this case, scene light is used only to detect the actual step difference of the aperture value of diaphragm 2 and the actual scene brightness is not related to diaphragm control operation.

Figure 2:
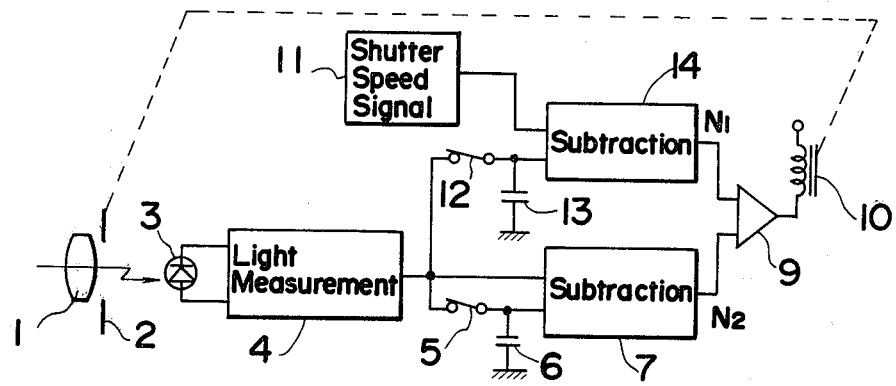
FIG. 2 is a block diagram schematically illustrating a general construction of a diaphragm setting circuit provided with a function of AE-lock photographing.

FIG. 2 schematically illustrates the circuitry in FIG. 1, where a function is added for AE-lock photography under shutter speed priority automatic diaphragm control. The same reference numbers are used for individual parts corresponding to those of FIG. 1. Signal generator circuit 8 in FIG. 1 is replaced with the circuitry in FIG. 2, where shutter speed signal generator circuit 11 (a fourth signal generating means) generates a voltage signal commensurate with a preset or preselected shutter speed and switch 12 is manually opened at any desired time. When switch 12 is opened, an output of light measuring circuit 4 generated immediately before the opening of switch 12 is stored in capacitor 13, i.e., capacitor 13 holds the output of light measuring circuit 4 which is commensurate with the brightness of an object measured through the fully open diaphragm aperture. Subtraction circuit 14 subtracts an output signal of speed signal generator circuit 11 from the stored value of capacitor 13, and generates a voltage signal equal to the difference between both signals. This voltage signal corresponds to the step difference of the aperture value from the fully open diaphragm aperture to a proper aperture value which provides correct exposure in combination with the preset shutter speed to the object to be the subject of AE-lock upon AE-lock photography. Therefore, this voltage signal corresponds to the output signal from signal generator circuit 8 in FIG. 1 and the aperture of diaphragm 2 is then determined in response to a camera release operation as described in connection with the circuit shown in FIG. 1.

In FIG. 2 capacitor 6, subtraction circuit 7, voltage comparator circuit 9, capacitor 13 and subtraction circuit 14 constitute a diaphragm control means. Furthermore capacitor 6 is a second storing means, capacitor 13 is a first storing means, subtraction circuit 7 is a second calculating means, and subtraction circuit 14 is a first calculating means.

The relations between the exposure factors in diaphragm control operation of the circuitry in FIG. 2 will be represented in accordance with the APEX system. Ev 1 and BV 1 denote exposure value and luminance value for an object to be the subject of AE-lock measured at a desired time prior to a camera release operation, while Ev 2 and Bv 2 denote exposure value and luminance value for an object to be actually photographed, measured at the time of a camera release. Av 0 is the aperture value of the fully open diaphragm aperture and Tv M (a fourth signal), the time value of a preset shutter speed. Tv 1 and Tv 2 (first and second signals, respectively) are correct exposure time values for exposure values Ev 1 and Ev 2 at fully open aperture value Av 0, respectively. Av M is a correct aperture value for exposure value Ev 1 at time value Tv M (a fourth signal). It should be noted that light measuring circuit 4 provides information including film sensitivity Sv. Thus, the information stored in capacitor 13 for AE-lock photographing operation is as follows:

$$Bv\ 1 + Sv - Av\ 0$$

This equals the corect shutter speed Tv 1 for the object to be the subject of AE-lock, measured at a desired time prior to a camera release operation. Accordingly, output signal N1 of subtraction circuit 14 is as follows:

$$N1 = Tv\ 1 - Tv\ M = Av\ M - Av\ 0 \qquad (1)$$

Similarly, output signal N2 of subtraction circuit 7 is given below:

$$N2 = Tv\ 2 - Tv\ c = Av\ c - Av\ 0 \qquad (2)$$

Av c is the aperture value during diaphragm stopping-down operation and thus varies with the time. Tv c (a third signal) represents a correct shutter speed for exposure value Ev 2 at this aperture value Av c. On the other hand, exposure values Ev 1 and Ev 2 are detailed below:

$$Ev\ 1 = Av\ 0 + Tv\ 1 = Av\ M + Tv\ M \qquad (3)$$

$$Ev\ 2 = Av\ 0 + Tv\ 2 = Av\ c + Tv\ c \qquad (4)$$

Voltage comparator circuit 9 compares N1 in equation (1) with N2 in equation (2). When N2 equals to N1, Av c also equals to Av M, and voltage comparator circuit 9 generates a signal for actuating electromagnet 10 of a diaphragm arresting device. However, the diaphragm arresting device fails to complete arrestment of the diaphragm simultaneously with the actuation of electromagnet 10 due to a response delay of its mechanical parts. Thus, upon completion of arrestment of the diaphragm, subtraction circuit 7 generates output signal N2′ given by:

$$N2' = N1 + \Delta N \qquad (5)$$

wherein $\Delta N$ represents a step difference of the diaphragm stopped-down in excess of Av M. Therefore, an exposure value optimum for the object to be the subject of AE-lock can be obtained by slowing a shutter speed by $\Delta N$ steps from Tv M. Using equations (1) and (2), the above equation (5) is expressed as follows:

$$N2' = Tv\ 2 - Tv\ c = Tv\ 1 - Tv\ M + \Delta N \qquad (6)$$

With respect to Tv $M - \Delta N$, the above equation is arranged below:

$$Tv\ M - \Delta N = Tv\ 1 - Tv\ 2 + Tv\ c \qquad (7)$$

The left side of equation (7) represents a shutter speed corrected from the preset shutter speed by the amount of the excessively stopped-down diaphragm aperture. The first and second terms on the right side represent correct shutter speeds respectively for an object to be the subject of AE-lock and a scene to be actually photographed, at a fully open diaphragm aperture.

$$Tv\ 1 = Bv\ 1 + Sv - Av\ 0 \qquad (8)$$

$$Tv\ 2 = Bv\ 2 + Sv - Av\ 0 \qquad (9)$$

When both sides of equation (9) are subtracted from those of equation (8), respectively, the following equation is obtained:

$$Tv\ 1 - Tv\ 2 = Bv\ 1 - Bv\ 2 \qquad (9a)$$

Thus, equation (7) is arranged as follows:

$$Tv\ M - \Delta N = Bv\ 1 - Bv\ 2 + Tv\ c \qquad (10)$$

The values of equations (8) and (9) are obtained as the outputs of light measuring circuit 4 stored in capacitor 13 and capacitor 6 respectively, and Tv c in equations (7) and (10) is obtained as an output of light measuring circuit 4 when and after the diaphragm control operation has been completed. This makes it possible to determine a corrected shutter speed represented by equation (7).

It is to be noted that with the construction shown in FIG. 2, light from an object to be the subject of AE-lock and a scene to be actually photographed are measured by the same light measuring circuit. However, such light may be measured by different light measuring circuits. When a camera is constructed to use an independent exposure meter (a light measuring device) for measuring light from an object to be the subject of AE-lock, it becomes possible to effect AE-lock photography with the camera preset or prefixed to any desired photographic composition.

The theoretical description of the present invention has been completed as above. Explanation will now be given of the embodiments of the present invention.

Figure 3:
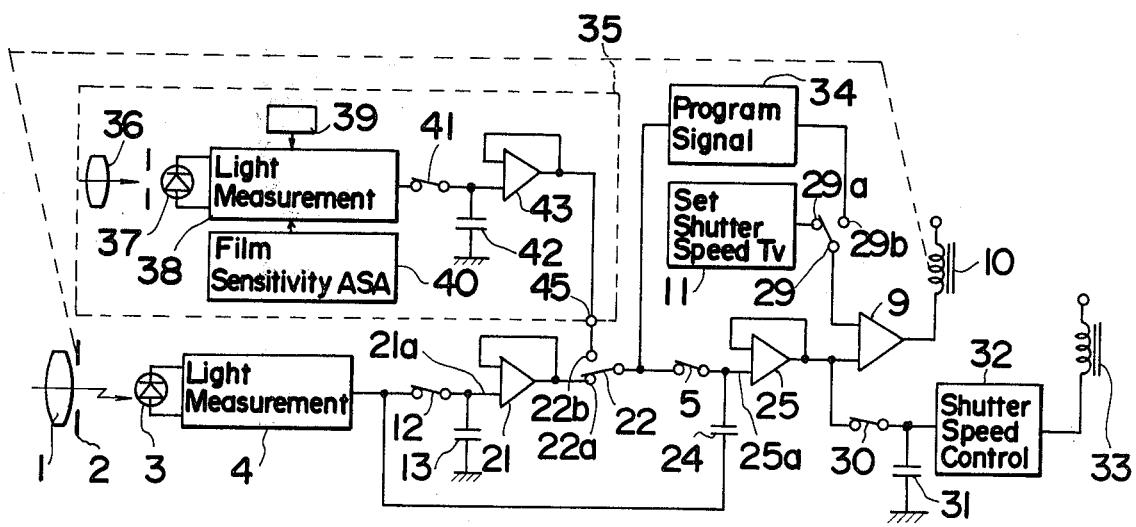
FIG. 3 is a block diagram of one embodiment of the present invention.

FIG. 3 illustrates a first embodiment of the present invention, wherein a camera is constructed so as to permit selection of a first system in which a common built-in light measuring circuit provides the two light measurement information (Tv 1 and Tv 2), and a second system in which a built-in light measuring circuit provides one of the two light measurement information while an independent light measuring system provides the other of the two measurement information, respectively. With reference to FIG. 3, the same reference numbers are used for all parts corresponding to FIGS. 1 and 2. Referring to FIG. 3, light measuring circuit 4 (first or second light measuring means) generates a voltage signal indicating a shutter speed determined by the brightness of an object, diaphragm aperture and film sensitivity. This voltage signal is linear in relation to exposure time value Tv. Memory switch 12 transmits to capacitor 13 the light measurement result of an object to be the subject of AE-lock. When switch 12 is opened, the light measurement result is stored and held in capacitor 13 as a voltage. Buffer amplifier 21 transmits to the next stage circuit a voltage across capacitor 13 i.e., stored information in capacitor 13. Block 35 circled by the dotted-line is an independent light measuring system externally provided for the camera and is electrically connectable to a diaphragm control circuit by change-over switch 22.

Figure 4:
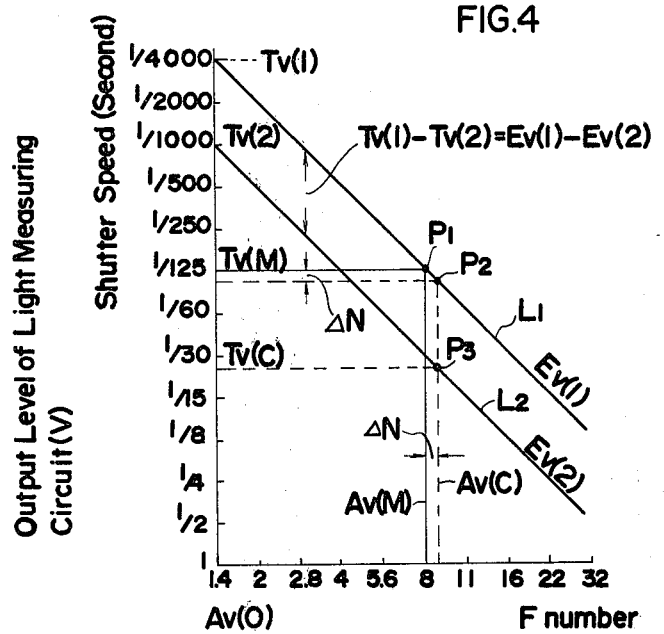
FIG. 4 shows a graph explaining the operation of the embodiment in FIG. 3.

The following description is of the circuitry and operation when switch 22 is closed on contact 22a. Light measuring system 35 is separated from a diaphragm control circuit, and a built-in light measuring system, including objective 1, diaphragm 2 and light measuring circuit 4 is connected to a diaphragm control circuit. AE-lock is effected when the light from an object to be the subject of AE-lock is measured at any desired time and thereafter switch 12 is opened. In this case, the voltage signal stored in capacitor 13 corresponds to correct time value for the object at a fully open diaphragm aperture; namely Tv 1 in equations (1) and (8). Assuming that this time value corresponds to a shutter speed, such as 1/4000 sec, as shown in FIG. 4. Tv 1, i.e., the voltage signal stored in capacitor 13 is transmitted to the top terminal of capacitor 24 through buffer amplifier 21. Subsequently, when light measurement is effected on an actually photographed scene, light measuring circuit 4 generates a voltage signal commensurate with time value for the scene at fully open aperture, i.e., Tv 2 in equations (2) and (9), the voltage signal being applied to the bottom terminal of capacitor 24. Accordingly, capacitor 24 is charged to a voltage level in accordance with the difference between the two voltage signals, i.e., Tv 1−Tv 2. If a shutter speed equal to Tv 2 is 1/1000 sec., for example, the voltage between both terminals of capacitor 24 corresponds to the value of difference by two steps in shutter speed. When a camera release button is pressed to initiate stopping-down operation of diaphragm 2, switch 5 is opened immediately before the start of the stopping-down operation and capacitor 24 holds voltage Tv 1—Tv 2. Subsequentially, the output of light measuring circuit 4 decreases as diaphragm 2 is stopped-down. At this time, the output of light measuring circuit 4 corresponds to Tv c in equations (4) and (10) and a voltage at the top terminal of capacitor 24 is represented as follows:

$$Tv\ 1 - Tv\ 2 + Tv\ c$$

The value determined by the above equation varies with the stopping-down operation of diaphragm 2. FIG. 4 shows how the value varies. Referring to FIG. 4, straight line L2 indicates the voltage signal of light measuring circuit 4 which begins at a point corresponding to Tv 2 = 1/1000 sec. at the fully open aperture AV 0 and which descends linearly with the increase of the aperture value, i.e., the advance of the stopping-down operation of diaphragm 2. The above equation is represented by straight line L1 since the value thereof is commensurate with this voltage signal added by the voltage signal corresponding to Tv 1—Tv 2. The voltage at the top terminal of capacitor 24 is then applied through buffer amplifier 25 to voltage comparator circuit 9. Capacitor 24 and buffer amplifier 25 constitute part of a diaphram control means. Capacitor 24 is a means for storing the difference between first and second signals Tv 1 and Tv 2, and adding third signal Tv c to that difference when the diaphragm is stopped-down. Also applied to voltage comparator circuit 9 is a voltage equal to a preset shutter speed Tv M, generated by manual shutter speed setting circuit 11. When both of the voltages coincide with each other, voltage comparator circuit 9 generates an actuating signal for activating electromagnet 10 so that a diaphragm arresting device including electromagnet 10 arrests diaphragm 2 which is being stopped-down. With reference to FIG. 4, when shutter speed Tv M is set to 1/125 sec., for example, voltage comparator circuit 9 generates an actuating signal at point P1 in order to activate electromagnet 10. At point P1 the aperture value is F8. However, diaphragm 2 actually stops at position P2 when excessively stopped-down by $\Delta N$ steps from F8 due to a response delay of mechanical parts of the diaphragm arresting device. With reference to FIG. 4 or the above equations (9a) and (10), the shutter speed corresponding to point P2 on straight line L1 is slowed by $\Delta N$ from Tv M, and provides correct exposure in combination with the aperture value excessively stopped-down from original correct aperture value F8. On the other hand, an output voltage of buffer amplifier 25 is stored in capacitor 31 through memory switch 30. Switch 30 is opened immediately before the mirror in a single-lens reflex camera is lifted up subsequent to the determination of the diaphragm aperture, i.e., completion of the arrestment of diaphragm 2. In response to completion of the lift-up of the mirror, a shutter is released to open and simultaneously therewith shutter speed control circuit 32 initiates a time count in accordance with the memory contents of capacitor 31. After a lapse of time indicated as Tv M—$\Delta N$ in FIG. 4, a signal is sent to electromagnet 33, whereby the shutter is closed. Capacitor 31, shutter speed control circuit 32, and electromagnet 33 constitute shutter speed control means.

With the above construction, light responsive element 3 is arranged, e.g., near an eyepiece to face a pentagonal prism for use in a single-lens reflex camera. In contrast, memory switch 30 and capacitor 31 shown in FIG. 3 are unnecessary for a camera of the type in which light responsive element 3 is arranged to receive the scene light reflected from the leading shutter screen of a focal plane shutter and/or a film surface after having passed through objective 1 and disphragm 2. Even if the brightness of the scene varies during exposure, a camera of this type control shutter speed according to such light variations, and thus ensures correct exposure.

Description is now given of a case when light measuring system 25 is used. Light measuring system 35 is a light measuring device independent of a camera, e.g., its optical system is provided suitably to measure the brightness of a comparatively narrow area of a scene. On a focal plane of image formation lens 36 is provided a pinhole, behind which light responsive element 37 connected to light measuring circuit 38 is arranged. Light measuring circuit 38 receives signals of set film sensitivity and fully open aperture value Av 0 of objective 1 from a camera through film sensitivity setting unit 40 and transmitter 39. Light responsive element 37 and light measuring circuit 38 constitute first or second light measuring means. This causes photographic calculation to occur in light measuring circuit 38 such that it generates an output commensurate with time value Tv 1 represented by the following equation:

$$Tv = Bv_1 + Sv - Av_o = Ev_1 - Av_o \quad (11)$$

Switch 41 is manually opened at any desired time to store the light measuring output in capacitor 42. A buffer circuit is labeled 43. Light measuring system 35 provides information on the brightness of an object to be the subject of AE-lock. When switch 22 is closed to contact 22b, correct exposure time value Tv 1 for an object to be the subject of AE-lock at the fully open aperture Av 0 is applied to the top terminal of capacitor 24 and output Tv 2 of light measuring circuit 4 to the bottom terminal of the capacitor, whereby value Tv 1—Tv 2 is stored in capacitor 24 in the same manner as earlier referred to. The operation to be described below is identical to that of using only the light measuring system including objective 1, diaphragm 2, light responsive element 3 and light measuring circuit 4. It should be noted that connecting terminal 45 is to connect light measuring system 35 to the camera circuitry. In addition, change-over of switch 22 may be interlocked with the connection and disconnection of connecting terminal 45.

Block 34 is a program circuit to automatically set a shutter speed under a predetermined program in accordance with exposure value Ev 1 (a voltage at the top terminal of capacitor 24), in place of manually setting a shutter speed. The program circuit functions when switch 29 is changed-over from contact 29a to 29b. Even in this case, diaphragm aperture determination and correction operations for a shutter speed are performed in the same manner as stated above.

Figure 5:
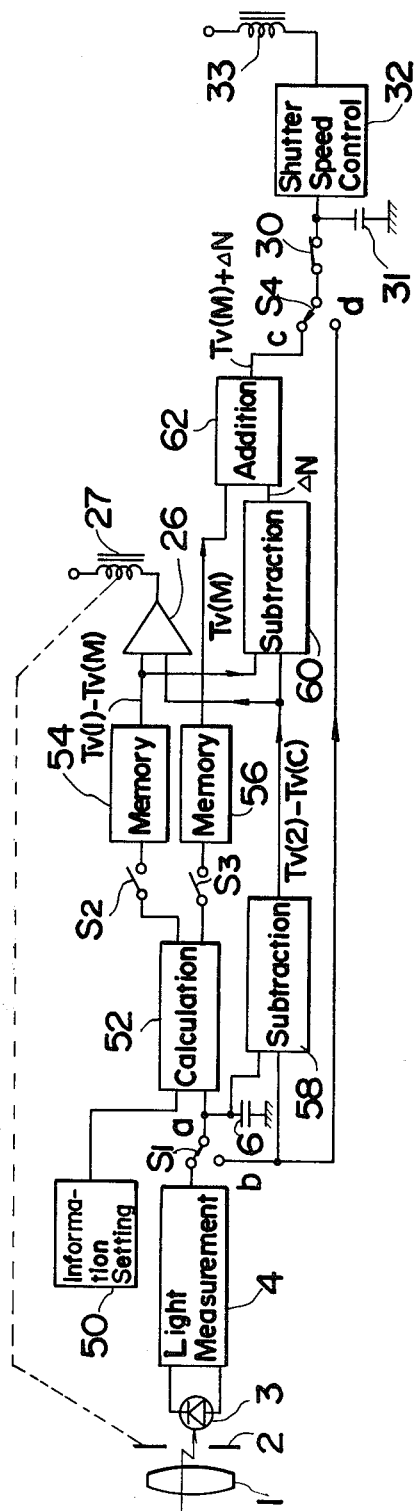
FIG. 5 is a block diagram of another embodiment of the present invention.

FIG. 5 is a second embodiment of the present invention. The same reference numbers are used for circuit components corresponding to the first embodiment. Light measuring circuit 4 generates a voltage signal based on a scene light having passed through diaphragm 2 and set film sensitivity. Photographic information setting device 50 operates a signal commensurate with a program constant for programmed shutter control, a signal commensurate with a preset step difference of the aperture value for diaphragm priority automatic exposure control, a signal commensurate with a preset shutter speed for shutter speed priority automatic exposure control, and a signal commensurate with a preset shutter speed and a preset step difference of the aperture value for manual setting. Switch S1 is changed from terminal a to b immediately before the diaphragm starts to be stopped-down. Capacitor 6 stores an output voltage of light measuring circuit 4 immediately before the start of stopping-down operation of diaphragm 2. Calculating circuit or processor 52 generates a signal commensurate with a step difference of the aperture value to be stopped-down and a signal commensurate with a preset shutter speed in accordance with signals from light measuring circuit 4 and photographic information setting device 50, respectively. Memory circuits 54 and 56 store the signals from calculating circuit 52, respectively. Switches S2 and S3 are manually opened at any desired time in AE-lock photography. Subtraction circuit 58 generates a signal commensurate with a difference between an output signal of light measuring circuit 4 generated during stopping-down operation of diaphragm 2 and a voltage stored in capacitor 6. Comparator circuit 26 compares signals from memory circuit 54 and subtraction circuit 58 to generate an actuating signal when the signals coincide with one another. A diaphragm arresting device including electromagnet 27 arrests diaphragm 2 in response to the actuating signal from comparator circuit 26. Circuits 60 and 62 are provided to offset an error in determination of the diaphragm aperture due to a response delay of mechanical parts of the diaphragm arresting device upon AE-lock photography, by correcting a preset shutter speed, thereby providing correct exposure. Subtraction circuit 60 generates a signal commensurate with a difference between the signals from memory circuit 54 and subtraction circuit 58. Adder circuit 62 generates a signal commensurate with the sum of signals from memory circuit 56 and subtraction circuit 60. Switch S4 is connected to terminal c for AE-lock photography and to terminal d for ordinary photography.

For ordinary photography, a step-difference signal of the aperture value and a shutter speed signal are generated by calculating circuit 52 in accordance with an output signal from light measuring 4 at the fully open aperture and signals from photographic information setting circuit 50, and are stored in memory circuits 54 and 56, respectively. It should be understood that signals stored in memory circuits 54 and 56 change as the level of the output signal of light measuring circuit 4 varies. In photographic operation, immediately before diaphragm 2 starts to be stopped-down, switch S1 is changed-over from terminal a to b, and an output generated by light measuring circuit 4 immediately before commencement of stopping-down operation of diaphragm 2, is stored in capacitor 6. During stopping-down operation of diaphragm 2, subtraction circuit 58 generates a voltage equal to the difference between the output voltage of light measuring circuit 4 and the output voltage of capacitor 6, i.e., a voltage commensurate with a step difference between the fully open aperture and a momentary diaphragm aperture being thus stopped-down. Comparator circuit 26 compares an output voltage from subtraction circuit 58 with that from memory circuit 54. When both signals coincide with each other and comparator circuit 26 generates an actuating signal, electromagnet 27 is actuated for causing the diaphragm arresting device to arrest diaphragm 2, whereby a diaphragm aperture is determined. Calculation circuit 52, memory circuit 54, capacitor 6, subtraction circuit 58 and comparator circuit 26 form a diaphragm control means.

For AE-lock photography, the above-described signals generated by calculating circuit 52 (first calculating means) immediately prior to opening of switches S2 and S3 are stored into memory circuits 54 (first storage means) and 56, respectively, and the stored signals remain unchanged thereafter even when the level of the output voltage of light measuring circuit 4 varies. Capacitor 6 constitutes a second storage means. Diaphragm control operation is thereafter performed in the same manner as in ordinary photograpy. Thus, a diaphragm aperture is determined in accordance with the signals from memory circuit 54 (first storage means) and subtraction circuit 58 (second calculating means). On the other hand, a shutter speed is determined as described hereunder. Subtraction circuit 60 (diaphragm determination error detecting means or third calculating means) applies to one input terminal of adder circuit 62 the difference between the signals from memory circuit 54 and calculating circuit 58, the difference applied upon the determination of the diaphragm aperture corresponding to $\Delta N$ (first signal) in equation (7), i.e., $Tv\ 1 - Tv\ 2 + Tv\ c - Tv\ M$. Adder circuit 62 adds this difference to the signal from memory circuit 56 which corresponds to $Tv\ M$ and generates a signal indicative of result of such addition. This signal generated upon the determination of the diaphragm aperture corresponds to $Tv\ M + \Delta N$ in equation (7), i.e. $Tv\ 1 - Tv\ 2 + Tv\ c$ and, when switch 30 is opened subsequent to the determination of the diaphragm aperture immediately before the lift-up of the mirror, it is stored in capacitor 31. Shutter speed control circuit 32 controls a shutter speed in accordance with the signal stored in capacitor 31. Thus, shutter speed control circuit 32 actuates electromagnet 33 to close the shutter when a period of time depending the signal stored in capacitor 31 has lapsed from the opening of the shutter which is caused by the lift-up of the mirror. In other words, the error $\Delta N$ caused by response delay of mechanical parts of the diaphragm arresting device in determination of the diaphragm aperture is calculated by subtraction circuit 60, and the preset shutter speed $Tv\ M$ is corrected by $\Delta N$ by adder circuit 62, so that the shutter is controlled at a corrected shutter speed $Tv\ M + \Delta N$. Information setting circuit 50 and calculation ciruit 52 form fourth signal generating means.

Figure 6:
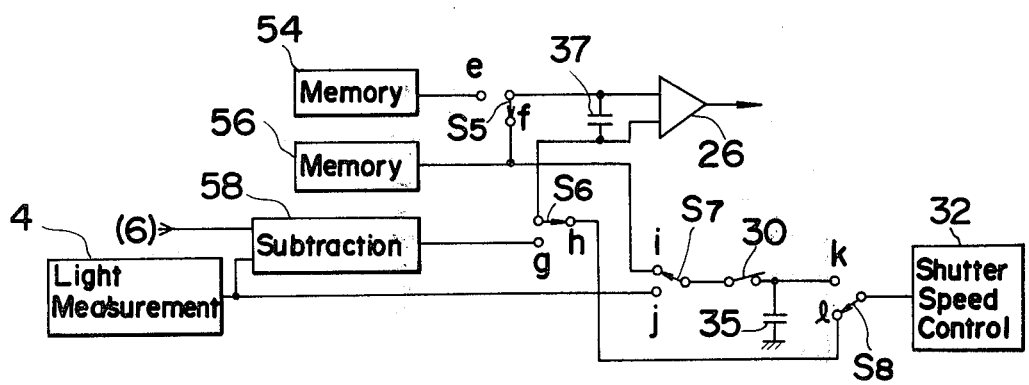
FIG. 6 is a block diagram illustrating a modification of the embodiment shown in FIG. 5.

FIG. 6 is a circuit diagram schematically illustrating a modification of the circuit arrangement shown in FIG. 5. In ordinary photography, switch S7 is connected to terminal j and switch S8 to terminal k. An output voltage of light measuring circuit 4 generated after a diaphragm aperture has been determined is stored in memory capacitor 35 and shutter speed control circuit 32 determines a shutter speed in accordance with the output stored in memory capacitor 35. In AE-lock photography, switch S7 is connected to terminal i and switch S8 to terminal l. When the diaphragm aperture is determined, switch S5 is changed over from terminal e to f and switch S6 from terminal g to h. Diaphragm 2 continues to be stopped-down to a smaller aperture to decrease the level of light measuring circuit 4 due to the response delay of mechanical parts of the diaphragm arresting device even after comparator circuit 26 generates an actuating signal for actuating electromagnet 33. As a result, an output voltage from subtraction circuit 58 becomes lower than that from memory circuit 54 after completion of the arrestment of diaphragm 2. This voltage difference corresponds to ΔN, i.e. Tv 1−Tv 2+Tv c−Tv M and is stored in capacitor 37. Through switch S5 connected to terminal f, the signal corresponding to Tv M is added to the voltage difference ΔN stored in capacitor 37 and a signal indicative of such an addition Tv M+ΔN is applied to shutter speed control circuit 32 through switches S6 and S8 connected to terminals h and k respectively. Capacitor 37 is a diaphragm determination error detecting means and capacitor 37 and switch 55 form an adding means.

The above embodiments employ analog circuitry, but digital circuitry may be introduced into the embodiments. Furthermore, the present invention is not limited to the above embodiments alone but various modifications are possible.

What we claim is:

1. In a camera which includes an objective and a diaphragm capable of being stopped-down from its fully open aperture in response to a camera release operation, an exposure control device comprising:
    first light measuring means for measuring light having passed through said objective and the aperture of said diaphragm and generating an output commensurate with the intensity of the measured light, said output generated at a desired time prior to a camera release operation being a first signal $S_1$, said output generated immediately prior to commencement of stopping-down operation of said diaphragm being a second signal $S_2$, and said output generated in the course of stopping-down operation of said diaphragm being a third signal $S_3$ wherein said third signal $S_3$ varies as said diaphragm is stopped-down;
    means for generating a fourth signal $S_4$ commensurate with a preselected shutter speed;
    means for arresting said diaphragm;
    diaphragm control means for calculating with said first to fourth signals $S_1$ to $S_4$ and generating an actuating signal for actuating said arresting means when said first to fourth signals $S_1$ to $S_4$ satisfy the general formula of $S_4 = S_1 - S_2 + S_3$ as a result of the variation of said third signal due to the stopping-down operation of said diaphragm, said diaphragm arresting means having a delayed response to complete the arresting of said diaphragm from the time of generation of said actuating signal by said diaphragm control means; and
    shutter speed control means for calculating with said first and second signals $S_1$, $S_2$ and output $S_3'$ of said first light measuring means generated after completion of the arresting of said diaphragm and controlling a shutter speed in accordance with the calculation results $S_1 - S_2 + S_3'$.

2. An exposure control device as defined in claim 1, further comprising:
    an optical system which includes an objective and a diaphragm which are seperately provided from said objective and said diaphragm of said camera; and
    second light measuring means for measuring light having passed through said objective and said diaphragm of said optical system and generating an output commensurate with the intensity of the measured light, wherein said diaphragm control means is connectable to said second light measuring means such that it employs said output of said second light measuring means generated at a desired time prior to a camera release operation for the calculation in place of said first signal.

3. An exposure control device as defined in claim 1, wherein diaphragm control means includes:
    second memory means for memorizing said second signal;
    first calculating means for producing the difference between said first and fourth signals;
    first memory means for memorizing said difference;
    second calculating means for producing the difference between said second and third signals; and,
    a comparator for comparing said differences produced by said first and second calculating means with one another and generating said actuating signal for actuating said arresting means when said difference produced by said second calculating means represents a given relationship with respect to said difference produced by said first calculating means.

4. An exposure control device as defined in claim 1, wherein said diaphragm control means includes:
    means for storing said first signal;
    means for storing the difference between said first and second signals at the time when said second signal is generated and adding said third signal to said difference between said first and second signals when said diaphragm is stopped-down; and
    a comparator for comparing said third signal added by said difference between said first and second signals with said fourth signal and generating said actuating signal for actuating said arresting means when said third signal added by said difference between said first and second signals represents a given relationship with respect to said fourth signal.

5. An exposure control device as defined in claim 1, wherein said shutter speed control means includes:
    means for calculating with said first and second signals $S_1$, $S_2$ and said output $S_3'$ to produce a sum signal corresponding to the sum of said outputs $S_3'$ and the difference between said first and second signals $S_1$, $S_2$;
    storage means for storing said sum signal produced by said calculating means, after the arresting of said diaphragm; and
    means for determining a shutter speed in accordance with said sum signal stored by said storage means.

6. An exposure control device as defined in claim 1, wherein said first light measuring means includes means for counting information of a set film sensitivity in said output.

7. In a camera which includes an objective and a diaphragm capable of being stopped-down from its fully open aperture in response to a camera release operation, an exposure control device comprising:
    an optical system which includes an objective and a diaphragm provided separately from said objective and said diaphragm of said camera;
    first light measuring means for measuring light having passed through said objective and said diaphragm of said optical system and generating an output commensurate with the intensity of the measured light, said output generated at a desired time prior to a camera release operation being a first signal $S_1$;
    second light measuring means for measuring light having passed through said objective and said diaphragm of said camera and generating an output commensurate with the intensity of the measured light, said output of said second light measuring means generated immediately prior to commencement of stopping-down operation of said diaphragm of said camera being a second signal $S_2$ and that generated in the course of the stopping-down operation of said diaphragm of said camera being a third signal $S_3$ wherein said third signal varies as said diaphragm of said camera is stopped-down;

means for generating a fourth signal $S_4$ commensurate with a preselected shutter speed;

means for arresting said diaphragm of said camera;

diaphragm control means for making calculation with said first to fourth signals $S_1$ to $S_4$ and generating an actuating signal for actuating said arresting means when said first to fourth signals $S_1$ to $S_4$ satisfy the general formula $S_4 = S_1 - S_2 + S_3$ as a result of the variation of said third signal $S_3$ due to the stopping-down operation of said diaphragm of said camera, said diaphragm arresting means having a delayed response to complete the arresting of said diaphragm of said camera from the time of generation of said actuating signal by said diaphragm control means; and shutter speed control means for calculating with said first and second signals $S_1$, $S_2$ and said output $S_3'$ of said second light measuring means generated after the completion of the arresting of said diaphragm of said camera and controlling a shutter speed in accordance with the calculation results $S_1 - S_2 + S_3'$.

8. An exposure control device as defined in claim 7, wherein said shutter speed control means includes:

means for calculating with said first and second signals $S_1$, $S_2$ and said output $S_3'$ to produce a sum signal corresponding to the sum of said output $S_3'$ and the difference between said first and second signals $S_1$, $S_2$;

storage means for storing said sum signal produced by said calculating means, after the arresting of said diaphragm; and means for determining a shutter speed in accordance with said sum signal stored by said storage means.

9. An exposure control device as defined in claim 7, wherein said first and second light measuring means include means for counting information of a set film sensitivity in their outputs, respectively.

10. An exposure control device as defined in claim 7, wherein said optical system is arranged to have said first light measuring means measure the brightness of a comparatively narrow scene area.

11. In a camera which includes an objective and a diaphragm capable of being stopped-down from a fully open aperture in response to a camera release operation, an exposure control device comprising:

light measuring means for measuring light having passed through said objective and said diaphragm for generating an output commensurate with the intensity of the measured light, the output generated at a desired time prior to a camera release operation being a first signal $S_1$, the output generated immediately prior to commencement of stopping-down operation of said diaphragm being a second signal $S_2$, and the output generated in the course of stopping-down operation of said diaphragm being a third signal $S_3$ varying as said diaphragm is stopped-down;

means for generating a fourth signal $S_4$ commensurate with a preselected shutter speed;

means for arresting said diaphragm;

diaphragm control means for calculating with said first to fourth signals $S_1$ to $S_4$ and generating an actuating signal for actuating said arresting means when said first to fourth signals satisfy the general formula $S_4 = S_1 - S_2 + S_3$ as a result of the variation of said third signal due to stopping-down operation of said diaphragm, said diaphragm arresting means having delayed response to complete the arresting of said diaphragm from the time of generation of said actuating signal by said diaphragm control means;

means for detecting a diaphragm determination error resulting from said delayed response of said diaphragm arresting means in accordance with said first, second and fourth signals $S_1$, $S_2$, $S_4$ and the output $S_3'$ of said light measuring means generated after the completion of the arresting of said diaphragm, to generate a fifth signal corresponding to the detected diaphragm determination error;

means for adding said fifth signal to said fourth signal; and a shutter speed control circuit for determining a shutter speed in accordance with said added fourth and fifth signals.

12. An exposure control device as defined in claim 11, wherein said diaphragm control means includes:

first calculating means for making calculation with said first and fourth signals to produce the difference therebetween;

first storage means for storing said difference produced by said first calculating means;

second storage means for storing said second signal;

second calculating means for making calculation with said second signal stored by said second storage means and said third signal to produce the difference therebetween when said diaphragm is stopped-down; and, a comparator for comparing said difference stored by said first storage means with that produced by said second calculating means and generating said actuating signal for actuating said arresting means when said difference produced by said second calculating means represents a given relationship with respect to said difference stored by said first storage means.

13. An exposure control device as defined in claim 12, wherein said diaphragm determination error detecting means includes third calculating means for calculating with the difference produced by said first calculating means and that produced by said second calculating means to generate said fifth signal after the completion of the arresting of said diaphragm.

* * * * *